United States Patent
Sato

(10) Patent No.: US 11,787,961 B2
(45) Date of Patent: Oct. 17, 2023

(54) INK JET PROCESS AND RECORDING

(71) Applicant: Seiko Epson Corporation, Toyko (JP)

(72) Inventor: Chigusa Sato, Shiojiri (JP)

(73) Assignee: SEIKO EPSON CORPORATION

( * ) Notice: Subject to any disclaimer, the term of this patent is extended or adjusted under 35 U.S.C. 154(b) by 64 days.

(21) Appl. No.: 17/329,281

(22) Filed: May 25, 2021

(65) Prior Publication Data

US 2021/0371685 A1 Dec. 2, 2021

(30) Foreign Application Priority Data

May 26, 2020 (JP) ................................ 2020-091102

(51) Int. Cl.
| | | |
|---|---|---|
| *C09D 11/107* | (2014.01) | |
| *B41J 11/00* | (2006.01) | |
| *B41M 5/00* | (2006.01) | |
| *C09D 11/322* | (2014.01) | |
| *C09D 11/101* | (2014.01) | |

(52) U.S. Cl.
CPC ........... *C09D 11/107* (2013.01); *B41J 11/002* (2013.01); *B41M 5/0023* (2013.01); *C09D 11/322* (2013.01); *C09D 11/101* (2013.01)

(58) Field of Classification Search
CPC ... C09D 11/101; C09D 11/322; C09D 11/107; C09D 11/30; B41M 7/0081; B41M 5/0047; B41M 5/0023; B41J 11/00214; B41J 11/0021; B41J 2/2107; B41J 2/01
See application file for complete search history.

(56) References Cited

U.S. PATENT DOCUMENTS

| | | | | |
|---|---|---|---|---|
| 7,741,380 B2 * | 6/2010 | Nakamura | ........... | B41M 7/0081 522/74 |
| 2004/0167296 A1 * | 8/2004 | Klee | ................... | C08G 59/145 525/474 |
| 2005/0190245 A1 * | 9/2005 | Desie | ................... | B41M 5/0047 347/100 |
| 2011/0037805 A1 * | 2/2011 | Arai | ....................... | C09D 11/54 523/200 |
| 2011/0242243 A1 * | 10/2011 | Miyabayashi | ............. | B41J 2/01 347/102 |
| 2013/0222497 A1 * | 8/2013 | Nakano | .................. | B41J 2/2114 347/100 |
| 2015/0251453 A1 * | 9/2015 | Nakai | .................. | B41M 5/0011 118/705 |
| 2019/0085190 A1 * | 3/2019 | De Meutter | ........... | C09D 11/40 |
| 2019/0100665 A1 * | 4/2019 | Kondo | ................. | C09D 11/101 |
| 2020/0148901 A1 * | 5/2020 | Ikeda | ......................... | B41J 2/01 |
| 2020/0215828 A1 * | 7/2020 | Watanabe | ............ | C09D 11/101 |
| 2021/0095135 A1 * | 4/2021 | Jarrett | .................. | B41M 5/0023 |
| 2021/0206175 A1 * | 7/2021 | Sasada | ................. | C09D 11/107 |
| 2021/0292859 A1 * | 9/2021 | Courtet | ................ | C09D 11/322 |

FOREIGN PATENT DOCUMENTS

| | | |
|---|---|---|
| CN | 105273491 A | 1/2016 |
| JP | 2013-203846 A | 10/2013 |

OTHER PUBLICATIONS

Bollore Thin Papers—Primapage New While—https://bollorethinpapers.com/ (Accessed Feb. 22, 2023). (Year: 2023).*

* cited by examiner

*Primary Examiner* — John Zimmermann

(74) *Attorney, Agent, or Firm* — Harness, Dickey & Pierce, P.L.C.

(57) ABSTRACT

An ink jet process includes an ejection step, in which a radiation-curable ink jet composition is ejected from an ink jet head to a recording medium, and a curing step, in which the ejected ink jet composition is irradiated with radiation to give a cured coating of the ink jet composition. The ink jet composition contains at least one polymerizable compound, at least one photopolymerization initiator, and C.I. Pigment Red 57:1. The C.I. Pigment Red 57:1 constitutes 4.0% by mass or more of the total amount of the ink jet composition, and the cured coating has a maximum thickness of 5 µm or less.

6 Claims, No Drawings

INK JET PROCESS AND RECORDING

The present application is based on, and claims priority from JP Application Serial Number 2020-091102, filed May 26, 2020, the disclosure of which is hereby incorporated by reference herein in its entirety.

BACKGROUND

1. Technical Field

The present disclosure relates to an ink jet process and a recording.

2. Related Art

In a known ink jet process, printing is produced using radiation-curable ink jet compositions. One favorable feature of such an ink jet process is that it can be applied to a wider variety of recording media than with non-curable ink jet compositions. For example, JP-A-2013-203846 discloses an ink jet recording method in which the recording medium can be a piece of corrugated board.

The ink jet recording method according to JP-A-2013-203846, however, is disadvantageous in that color strength tends to be unacceptable when the method is applied to a recording medium for flexible packaging. To be more specific, printing for flexible packaging involves rolling up the recording after printing on an unfolded roll of recording medium. When the ink coating on the recording is thick at this stage, the rolling up is inefficient because of an extra thickness of the recording added by the ink coating. In flexible packaging applications, therefore, the coating needs to be thin.

Magenta inks that are used in this ink jet recording method include C.I. (Colour Index Generic Name) Pigment Red 122 and C.I. Pigment Red 48:4. With these colorants, color strength may be insufficient when the coating is thin. There is a need for an ink jet process that provides sufficient color strength even when the ink coating is thin.

SUMMARY

An ink jet process includes an ejection step, in which a radiation-curable ink jet composition is ejected from an ink jet head to a recording medium, and a curing step, in which the ejected ink jet composition is irradiated with radiation to give a cured coating of the ink jet composition. The ink jet composition contains at least one polymerizable compound, at least one photopolymerization initiator, and C.I. Pigment Red 57:1. The C.I. Pigment Red 57:1 constitutes 4.0% by mass or more of a total amount of the ink jet composition, and the cured coating has a maximum thickness of 5 μm or less.

A recording includes a recording medium and a cured coating of a radiation-curable ink jet composition formed on the recording medium. The cured coating contains 4.0% by mass or more C.I. Pigment Red 57:1 based on a total amount of the cured coating. The cured coating has a maximum thickness of 5 μm or less.

DESCRIPTION OF EXEMPLARY EMBODIMENTS

Embodiments

1. Radiation-Curable Ink Jet Composition

A radiation-curable ink jet composition according to an embodiment is applied to the ink jet process described below. A radiation-curable ink jet composition is cured and forms a cured coating when irradiated with radiation. Examples of types of radiation include ultraviolet radiation, an electron beam, infrared radiation, visible light, and X-rays. Of these, ultraviolet radiation is particularly preferred. There are many materials that cure well with the peak wavelength of UV radiation, and sources of UV radiation are also readily available.

The radiation-curable ink jet composition according to this embodiment contains at least one polymerizable compound, at least one photopolymerization initiator, and C.I. Pigment Red 57:1. The radiation-curable ink jet composition according to this embodiment may be referred to simply as the ink hereinafter. The components of the ink are described first.

1.1. Polymerizable Compound

Preferably, the ink according to this embodiment contains, as the at least one polymerizable compound, a vinyl-containing (meth)acrylate represented by formula (1) and one or more monofunctional (meth)acrylates having any of an aromatic-ring, alicyclic, or cyclic-ether structure. These polymerizable compounds have a (meth)acryloyl group as a polymerizable functional group. For better curability in the curing step (described later herein), it is preferred that the polymerizable functional group be an acryloyl group.

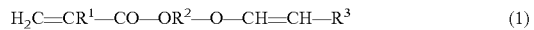

$$H_2C=CR^1-CO-OR^2-O-CH=CH-R^3 \quad (1)$$

(where $R^1$ is a hydrogen atom or methyl group, $R^2$ is a C2 to C20 divalent organic residue, and $R^3$ is a hydrogen atom or C1 to C11 monovalent organic residue)

A vinyl-containing (meth)acrylate represented by formula (1) is also referred to simply as a formula-(1) vinyl-containing (meth)acrylate. A monofunctional (meth)acrylate having any of an aromatic-ring, alicyclic, or cyclic-ether structure is also referred to simply as a ring-structured monofunctional (meth)acrylate.

As mentioned herein, (meth)acryloyl refers to at least one of acryloyl or the corresponding methacryloyl. A (meth)acrylate refers to at least one of an acrylate or the corresponding methacrylate. (Meth)acrylic refers to at least one of an acrylic or the corresponding methacrylic compound.

1.1.1. Formula-(1) Vinyl-Containing (Meth)acrylate

In formula (1), $R^2$ represents a C2 to C20 divalent organic residue. Examples include C2 to C20 linear, branched, or cyclic substituted or unsubstituted alkylene groups, C2 to C20 substituted or unsubstituted alkylene groups having at least a kind of ether or ester bond in their structure, and C6 to C11 substituted or unsubstituted divalent aromatic groups.

Of these, C2 to C6 alkylene groups are particularly preferred, including the ethylene, n-propylene, isopropylene, and butylene groups. C2 to C9 alkylene groups having an oxygen atom in their structure derived from an ether bond are also preferred, including the oxyethylene, oxy-n-propylene, oxyisopropylene, and oxybutylene groups. More preferably, the formula-(1) vinyl-containing (meth)acrylate is one that has a glycol ether chain in which $R^2$ is a C2 to C9 alkylene group having an oxygen atom in their structure derived from an ether bond, such as an oxyethylene, oxy-n-propylene, oxyisopropylene, or oxybutylene group. This reduces the viscosity and improves the curability of the ink.

In formula (1), $R^3$ represents a C1 to C11 monovalent organic residue. Examples include C1 to C10 linear, branched, or cyclic substituted or unsubstituted alkyl groups and C6 to C11 substituted or unsubstituted aromatic groups. Of these, C1 and C2 alkyl groups, i.e., the methyl and ethyl groups, are particularly preferred. C6 to C8 aromatic groups are also preferred, such as the phenyl and benzyl groups.

When an organic residue as specified above has a substituent, the substituent can be a carbon-containing or carbon-free group. When the substituent is a carbon-containing group, the carbon atom(s) in the substituent is included in the number of carbon atoms of the organic residue. Examples of carbon-containing groups include, but are not limited to, the carboxy group and alkoxy groups. Examples of carbon-free groups include, but are not limited to, the hydroxyl and halo groups.

Specific examples of formula-(1) vinyl-containing (meth) acrylates include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth) acrylate, 4-vinyloxybutyl (meth)acrylate, 1-methyl-3-vinyloxypropyl (meth)acrylate, 1-vinyloxymethylpropyl (meth) acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxy (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy) isopropyl (meth)acrylate, 2-(vinyloxyisopropoxy)propyl (meth)acrylate, 2-(vinyloxyisopropoxy)isopropyl (meth) acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate. Of these specific examples, 2-(2-vinyloxyethoxy) ethyl acrylate is particularly preferred. With this acrylate, it is easier to achieve a good balance between the curability and viscosity of the ink.

The formula-(1) vinyl-containing (meth)acrylate helps improve the curability of the ink in the curing step by virtue of its relatively good curability. With this compound, furthermore, the viscosity of the ink is relatively low.

Preferably, the percentage of the formula-(1) vinyl-containing (meth)acrylate in the ink is 5.0% by mass or more and 70.0% by mass or less, more preferably 10% by mass or more and 40% by mass or less, even more preferably 10% by mass or more and 30% by mass or less of the total amount of the ink. This reduces the viscosity of the ink, making the ejection of the ink from an ink jet head more stable.

When based on the total amount of polymerizable compounds, it is preferred that the percentage of the formula-(1) vinyl-containing (meth)acrylate in the ink be 7% by mass or more and 87% by mass or less, more preferably 12% by mass or more and 50% by mass or less, even more preferably 12% by mass or more and 37% by mass or less. This reduces the viscosity of the ink, making the ejection of the ink from an ink jet head more stable.

1.1.2. Ring-Structured Monofunctional (Meth)acrylate(s)

Of ring-structured monofunctional (meth)acrylates, examples of those having an aromatic-ring structure include, but are not limited to, phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth) acrylate.

Of these, benzyl (meth)acrylate is particularly preferred, phenoxyethyl (meth)acrylate is more preferred, and phenoxyethyl acrylate (PEA) is even more preferred. With any of these in the ink, the photopolymerization initiator dissolves better in the ink when containing an aromatic-ring structure. The curability of the coating of the ink is therefore improved.

Examples of monofunctional (meth)acrylates having an alicyclic structure include, but are not limited to, isobornyl (meth)acrylate, 4-tert-butylcyclohexyl (meth)acrylate, 2-(meth)acrylic acid-1,4-dioxaspiro[4.5]dec-2-ylmethyl ester, dicyclopentanyl acrylate, dicyclopentenyl acrylate, and dicyclopentenyloxyethyl (meth)acrylate.

Of these, isobornyl acrylate (IBXA) and 4-tert-butylcyclohexyl acrylate (TBCHA) are preferred for the curability of the ink and abrasion resistance of the cured coating.

Examples of monofunctional (meth)acrylates having a cyclic-ether structure include, but are not limited to, cyclic trimethylolpropane formal acrylate (CTFA), tetrahydrofurfuryl acrylate (THFA), (2-methyl-2-ethyl-1,3-dioxolan-4-yl) methyl acrylate.

One such ring-structured monofunctional (meth)acrylate may be used alone, or two or more may be used in combination. As such, the ring-structured monofunctional (meth) acrylate(s) helps reduce the viscosity of the ink by virtue of its relatively low viscosity. The ring-structured (meth)acrylate(s), moreover, comes into contact with the recording medium at a relatively small angle, which means the ink wets and spreads over the recording medium quickly in the ejection step. With ring-structured (meth)acrylate(s) in the ink, therefore, it is easy to produce a thin cured coating of the ink.

Preferably, the percentage of the ring-structured monofunctional (meth)acrylate(s) in the ink is 10% by mass or more and 80% by mass or less, more preferably 15% by mass or more and 70% by mass or less, even more preferably 20% by mass or more and 60% by mass or less of the total amount of the ink.

When based on the total amount of polymerizable compounds, it is preferred that the percentage of the ring-structured monofunctional (meth)acrylate(s) in the ink be 12% by mass or more and 100% by mass or less, more preferably 18% by mass or more and 88% by mass or less, even more preferably 25% by mass or more and 75% by mass or less.

1.1.3. Extra Polymerizable Compounds

Besides those described above, the ink may contain extra polymerizable compounds. An extra polymerizable compound may have any known polymerizable functional group that polymerizes in response to radiation. For curability reasons, it is preferred that the polymerizable functional group have a carbon-carbon double bond (be unsaturated), more preferably be the (meth)acryloyl group, even more preferably the acryloyl group. An extra polymerizable compound can be a monofunctional or multifunctional monomer.

1.1.3.1. Monofunctional Monomers

Examples of monofunctional monomers include, but are not limited to, (meth)acrylates having a linear or branched aliphatic group, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, 2-hydroxyethyl (meth)acrylate, and 2-hydroxypropyl (meth)acrylate; lactone-modified flexible (meth)acrylates; nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamide, N-hydroxymethyl(meth)acrylamide, diacetoneacrylamide, N,N-dimethyl(meth)acrylamide, dimethylaminoethyl acrylate benzyl chloride quaternary, and other (meth)acrylamides.

Other monofunctional monomers can also be used, including unsaturated carboxylic acids, such as (meth) acrylic acid, itaconic acid, crotonic acid, isocrotonic acid, and maleic acid, salts of unsaturated carboxylic acids, esters of unsaturated carboxylic acids, urethane, amides and anhydrides, acrylonitrile, styrene, and a variety of unsaturated polyesters, unsaturated polyethers, unsaturated polyamides, and unsaturated polyurethanes.

1.1.3.2. Multifunctional Monomers

Examples of multifunctional monomers include, but are not limited to, bifunctional (meth)acrylates, such as dipropylene glycol diacrylate (DPGDA), diethylene glycol di(meth)acrylate, triethylene glycol di(meth)acrylate, tetraethylene glycol di(meth)acrylate, polyethylene glycol di(meth) acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth) acrylate, di(meth)acrylate of EO (ethylene oxide) adducts of bisphenol A, di(meth)acrylate of PO (propylene oxide) adducts of bisphenol A, hydroxypivalic acid neopentyl glycol di(meth)acrylate, and polytetramethylene glycol di(meth)acrylate; and (meth)acrylates having three or more functional groups, such as trimethylolpropane tri(meth)acrylate, EO-modified trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, propoxylated glycerol tri (meth)acrylate, caprolactone-modified trimethylolpropane tri(meth)acrylate, ethoxylated pentaerythritol tetra(meth) acrylate, and caprolactam-modified dipentaerythritol hexa (meth)acrylate.

1.2. Photopolymerization Initiator

Photopolymerization initiators function to produce active species upon exposure to radiation and promote the polymerization of a polymerizable compound with the active species. Specific examples of active species produced by a photopolymerization initiator include free radicals, acids, and bases. When a (meth)acrylate polymerizable compound as described above is used, it is preferred to use a photopolymerization initiator that produces free radicals.

The photopolymerization initiator can be of any kind as long as it functions as described above. Examples include acylphosphine oxide photopolymerization initiators, alkylphenone photopolymerization initiators, titanocene photopolymerization initiators, and thioxanthone photopolymerization initiators. Of these, acylphosphine oxide photopolymerization initiators are particularly preferred as they produce free radicals. They improve the curability of the ink, especially that in a process of curing with light from an UV-LED (ultraviolet light-emitting diode). One photopolymerization initiator may be used alone, or two or more may be used in combination.

Examples of acylphosphine oxide photopolymerization initiators include, but are not limited to, 2,4,6-trimethylbenzoyldiphenylphosphine oxide, bis(2,4,6-trimethylbenzoyl) phenylphosphine oxide, and bis(2,6-dimethoxybenzoyl)-2, 4,4-trimethylpentylphosphine oxide.

Commercially available acylphosphine oxide photopolymerization initiators can also be used. Examples include IGM Resins B.V.'s Omnirad® 819 (bis(2,4,6-trimethylbenzoyl)phenylphosphine oxide), Omnirad 1800 (a 25:75 (by mass) mixture of bis(2,6-dimethoxybenzoyl)2,4,4-trimethylpentylphosphine oxide and 1-hydroxycyclohexylphenylketone), Omnirad TPO (2,4,6-trimethylbenzoyldiphenylphosphine oxide) and Lambson Group Ltd.'s Speedcure® TPO (2,4,6-trimethylbenzoyldiphenylphosphine oxide).

Preferably, the photopolymerization initiator content of the ink is 3% by mass or more and 12% by mass or less, more preferably 5% by mass or more and 10% by mass or less, even more preferably 7% by mass or more and 9% by mass or less of the total amount of the ink. This improves the curability of the ink and, furthermore, ensures the photopolymerization initiator is dissolved into the ink.

1.3. Colorant

The colorant functions to color the cured coating formed by the ink. By coloring the cured coating of the ink, the recording medium can be colored, or a color image, for example, can be formed on the recording medium. The ink according to this embodiment is a magenta ink as it contains C.I. Pigment Red 57:1, a magenta pigment, as its colorant.

C.I. Pigment Red 57:1 is superior to other magenta pigments, such as C.I. Pigment Red 122 and 48:4, in terms of color strength. In particular, it expands the color gamut when producing a deep red with an L value, a measure of lightness, of 50 or less. A cured coating of an ink made with C.I. Pigment Red 57:1 is therefore better than with others known in color strength and color reproduction, even when formed thin. By virtue of this, the ink according to this embodiment helps ensure a broad color gamut even in flexible packaging applications, in which the viewing distance tends to be shorter than in signage applications.

The percentage of C.I. Pigment Red 57:1 in the ink is 4.0% by mass or more of the total amount of the ink. This ensures the cured coating of the ink delivers improved color strength even when formed thin. Preferably, the percentage of C.I. Pigment Red 57:1 is 4.0% by mass or more and 8.0% by mass or less. Besides improved color strength of the cured coating, this offers the advantage of improved curability of the ink; in the step of curing the ink, the photopolymerization of the polymerizable compound is faster because of limited absorption of radiation by the colorant. The viscosity of the ink, furthermore, does not increase excessively.

Preferably, the average diameter of the particles of C.I. Pigment Red 57:1 is 300 nm or less, more preferably 50 nm or more and 200 nm or less. This helps improve the ejection stability of the ink, the stability of dispersion of components dispersed in the ink, and the quality of the image the cured coating forms on the recording medium. It should be noted that this average diameter of particles refers to that determined from a particle size distribution by volume (50%) measured by dynamic light scattering.

1.4. Additives

The ink may optionally contain additives, such as a dispersant, a polymerization inhibitor, a slipping agent, and a photosensitizer.

1.4.1. Dispersant

A dispersant gives pigment dispersibility in ink. Stable dispersion of pigment in ink achieved with the use of a dispersant provides some improvements. For example, the pigment is prevented from settling down when the ink is stored, and the ejection of the ink from the ink jet head becomes more stable.

Examples of dispersants include, but are not limited to, polymeric and other known dispersants commonly used in preparing a liquid dispersion of pigment. Specific examples include dispersants that are primarily one or more of a polyoxyalkylene polyalkylene polyamine, a vinyl polymer or copolymer, an acrylic polymer or copolymer, polyester, polyamide, polyimide, polyurethane, an amino polymer, a silicon-containing polymer, a sulfur-containing polymer, a fluoropolymer, or epoxy resin. One dispersant may be used alone, or two or more may be used in combination.

Commercially available polymeric dispersants may also be used. Examples include Ajinomoto Fine-Techno's AJIS-PER® dispersants, Lubrizol's Solsperse® dispersants, such as Solsperse 36000, BYK Additives & Instruments' DISPERBYK dispersants, and Kusumoto Chemicals' DISPARLON® dispersants.

Preferably, the dispersant content of the ink is 0.05% by mass or more and 1.00% by mass or less, more preferably 0.10% by mass or more and 0.50% by mass or less, of the total amount of the ink. This further improves the storage stability and ejection stability of the ink.

1.4.2. Polymerization Inhibitor

A polymerization inhibitor improves the storage stability of the ink by controlling unintended polymerization of the polymerizable compound, for example during storage. One polymerization inhibitor may be used alone, or two or more may be used in combination.

Examples of polymerization inhibitors include, but are not limited to, 4-methoxyphenol (MEHQ), 4-hydroxy-2,2,6,6-tetramethylpiperidine N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol), and hindered amine compounds.

When a polymerization inhibitor is added, it is preferred that the polymerization inhibitor content of the ink be 0.05% by mass or more and 1.00% by mass or less, more preferably 0.05% by mass or more and 0.50% by mass or less, of the total amount of the ink.

1.4.3. Slipping Agent

A slipping agent improves abrasion resistance of the cured coating of the ink. One slipping agent may be used alone, or two or more may be used in combination.

Preferably, the slipping agent(s) is silicone surfactant(s), more preferably polyester—or polyether-modified silicone(s). Commercially available slipping agents can be used, including BYK Additives & Instruments' polyester-modified silicones, such as BYK®-347 and -348 and BYK-UV 3500, 3510, and 3530, and polyether-modified silicones, such as BYK-UV 3570.

When a slipping agent is added, it is preferred that the slipping agent content of the ink be 0.01% by mass or more and 2.00% by mass or less, more preferably 0.05% by mass or more and 1.00% by mass or less, of the total amount of the ink.

1.4.4. Photosensitizer

A photosensitizer becomes excited by absorbing radiation and promotes the generation of an active species from the photopolymerization initiator. One photosensitizer may be used alone, or two or more may be used in combination.

Examples of photosensitizers include amine compounds, such as aliphatic amines, amines containing an aromatic group, piperidine, products of reaction between epoxy resin and amines, and triethanolamine triacrylate; urea compounds, such as allylthiourea and o-tolylthiourea; sulfur compounds, such as sodium diethyldithiophosphate and soluble salts of aromatic sulfinic acids; nitrile compounds, such as N,N-diethyl-p-aminobenzonitrile; phosphorus compounds, such as tri-n-butylphosphine and sodium diethyl dithiosulfate; nitrogen compounds, such as Michler's ketone, N-nitrosohydroxylamine derivatives, oxazolidine compounds, tetrahydro-1,3-oxazine compounds, and condensates between formaldehyde or acetaldehyde and diamines; and chlorine compounds, such as carbon tetrachloride and hexachloroethane. Thioxanthone photopolymerization initiators, mentioned earlier, can also be used as photosensitizers. An example of such a photosensitizer is 2,4-diethylthioxanthone.

When a photosensitizer is added, it is preferred that the photosensitizer content of the ink be 0.5% by mass or more and 3.0% by mass or less of the total amount of the ink.

2. Preparation of the Ink

The ink can be prepared by mixing its ingredients, described above, together and stirring the mixture thoroughly until homogeneous. In this embodiment, it is preferred to sonicate and/or warm a mixture of at least part of the photopolymerization initiator and of the polymerizable compound during the preparation process. This will reduce the amount of oxygen dissolved in the finished ink, improving ejection and storage stability.

3. Characteristics of the Ink

Preferably, the viscosity of the ink at 20° C. is 10 mPa·s (millipascal-seconds) or more and 30 mPa·s or less, more preferably 10 mPa·s or more and 25 mPa·s or less, even more preferably 10 mPa·s or more and 20 mPa·s or less. This ensures an appropriate amount of ink is ejected from the ink jet head, helping reduce curved flights and splashing of ink droplets. The viscosity of the ink is measured using Physica's MCR-300 rheometer. With this rheometer, the shear rate is increased from 10 to 1000 under 20° C. conditions, and the viscosity is read at a shear rate of 200.

Preferably, the surface tension of the ink at 20° C. is 20 mN/m or more and 40 mN/m or less. This prevents the ink from wetting the liquid-repellent nozzle plate of the ink jet head. An appropriate amount of ink is therefore ejected from the ink jet head properly, helping reduce curved flights and splashing of ink droplets. The surface tension of the ink is determined by spreading the ink on a platinum plate and measuring the surface tension using Kyowa Interface Science's CBVP-Z automated surface tensiometer under 20° C. conditions.

4. Ink Jet Apparatus

The following describes the ink jet apparatus used in the ink jet process according to this embodiment. The ink jet apparatus can be a known one, such as an ink jet printer. Specific examples include on-carriage or off-carriage serial printers and line-head printers.

The ink jet apparatus includes an ink jet head. The ink jet head ejects droplets of ink and attaches them, for example to a recording medium. For this purpose, the ink jet head has actuators, which drive the ink jet head. Examples of actuators include piezoelectric elements, which use the deformation of a piezoelectric material; electromechanical transducers, which use displacement of a diaphragm caused by electrostatic attraction; and electrothermal transducers, which use bubbles generated by heating. In this embodiment, the ink jet apparatus has an ink jet head equipped with piezoelectric elements.

The ink jet apparatus is equipped with a light source with which the ink attached to a recording medium is cured. The light source is an irradiation device, and examples include an UV-LED (ultraviolet light-emitting diode) and other light emitters. The radiation emitted by the light source does not need to be ultraviolet radiation but may be, for example, infrared light, an electron beam, visible light, or X-rays. The light source can be a light emitter, such as an LED (light-emitting diode) or LD (laser diode), or can alternatively be a lamp or similar device. The light source does not need to be part of the ink jet apparatus but may be a peripheral device.

The droplets of the ink attached to a recording medium is irradiated with radiation from the light source. This causes the polymerizable compound in the ink to polymerize through photopolymerization reactions. As a result, the droplets of the ink cure and form a cured coating of the ink.

When the ink according to this embodiment is used in flexible packaging applications (described later herein), it is preferred that the ink jet apparatus be equipped with a device that holds and supplies a rolled recording medium to the ink jet apparatus and with a device that rolls up the recording medium on which the cured coating of the ink has been formed. These devices can be known ones.

5. Recording Medium

The ink according to this embodiment is suitable for flexible packaging applications. A cured coating of the ink has a strong color even when formed thin, and forming a thin coating of ink prevents the finished recording from thickening when rolled because of an extra thickness added by the ink coating. In flexible packaging, the recording medium is flexible packaging film. A relatively thin and highly flexible film material, flexible packaging film is used for food packaging, packaging for toiletries and cosmetics, etc. Preferably, the flexible packaging film is one having a thickness of 70 μm or less, more preferably 50 μm or less, even more preferably 30 μm or less. When the thickness of the flexible packaging film is as small as this, the improvement of efficiency in rolling up the recording delivered by thinning the cured coating is significant.

Examples of materials of which flexible packaging film can be made include polyester resins, such as polyethylene terephthalate; polyamide resins, such as nylon and aramid; polyolefin resins, such as polyethylene and polypropylene; polycarbonate resins; polystyrene resins; and polyacetal resins. Of these materials, it is particularly preferred that the flexible packaging film be any of polyethylene terephthalate film, polyolefin film, or nylon film because these films are versatile and readily available.

For use as the flexible packaging film, any such material is shaped into film by casting (cast film) or by stretching the material uniaxially or biaxially (uniaxially or biaxially oriented film). Of these, biaxially oriented film is preferred. Alternatively, the recording medium may be cut sheets of any such material. A laminate formed by joining layers of such a film or cut sheets together may also be used.

The substrate of flexible packaging film, for example, made of a material such as listed above may contain a material that gives the substrate antifog and/or antistatic properties, an antioxidant, etc. Examples of materials that can be used to give the substrate antifog and/or antistatic properties include anionic, nonionic, and cationic surfactants, vinyl resins, and acrylic resins. Examples of antioxidants include phenolic, thioether, and phosphate antioxidants.

The ink according to this embodiment can be used with recording media not for flexible packaging applications. Instead of such materials as listed above, the recording medium may be made of glass, paper, metal, or wood. The recording medium, moreover, may have a substrate made of any of these materials whose surface has been treated. As for form, the recording medium does not need to be film- or sheet-shaped but may be a board or fabric.

6. Ink Jet Process

An ink jet process according to an embodiment includes an ejection step, in which ink as described above is ejected from an ink jet head to a recording medium, and a curing step, in which the ejected ink is irradiated with radiation to give a cured coating. The following describes each step in the ink jet process according to this embodiment. In the ink jet process according to this embodiment, a combination of multiple inks (set of inks) may also be used.

6.1. Ejection Step

In the ejection step, ink is ejected from an ink jet head of an ink jet apparatus and attached to a recording medium. To be more specific, the ink is in pressure chambers in the ink jet head, and piezoelectric elements are driven to eject the ink through ejection nozzles. The attachment of the ink to the recording medium is in such a manner that the thickness of the cured coating of the ink formed in the subsequent curing step will be 5 µm or less. This produces a liquid layer of ink on the surface of the recording medium.

6.2. Curing Step

In the curing step, the liquid layer of ink formed on the recording medium is processed to give a cured coating of the ink. To be more specific, the recording medium is irradiated with radiation from a light source, with the radiation directed toward a predetermined area of the recording medium. The area of the recording medium to be irradiated with radiation only needs to include the region to which the ink has been attached. The irradiation causes the polymerizable compound in the ink to polymerize through photopolymerization inside the liquid layer of ink on the recording medium. As a result, the ink cures and forms a cured coating.

Preferably, the curing step is carried out in an atmosphere in which the concentration of oxygen is 15 vol % or less, more preferably 10 vol % or less, even more preferably 5 vol % or less. This limits the inhibitory effect of oxygen on the photopolymerization taking place in the ink, thereby helping quicken the curing of the ink. To be more specific, free-radical polymerization proceeds through reaction between free radicals produced by a photopolymerization initiator and radically polymerizable double bonds, for example of a (meth)acrylate. Oxygen, however, is more reactive than free radicals with the double bonds. In an oxygen-rich reaction system, therefore, the free radicals are consumed by reacting with oxygen. The reaction between oxygen and the free radicals produces another kind of free radicals, and these free radicals are not very reactive with the double bonds. As a result, the free radical polymerization is inhibited by oxygen.

A possible way to make the oxygen concentration during the curing step 15 vol % or less is to release an inert gas, such as nitrogen or carbon dioxide, into the atmosphere in which the curing step is carried out. The oxygen concentration can be measured using, for example, a known atmospheric oxygen meter.

Through these steps, a recording is obtained as a combination of a recording medium and a cured coating of ink formed thereon. A recording according to an embodiment includes a recording medium and a cured coating of ink formed on the recording medium. The cured coating contains 4.0% by mass or more C.I. Pigment Red 57:1 based on the total amount of the cured coating. The cured coating, moreover, has a maximum thickness of 5 µm or less. The recording is thin as the cured coating has a maximum thickness of 5 µm or less. Nevertheless, by virtue of the composition of the cured coating, the recording achieves improved color strength and good color reproduction.

The maximum thickness of the cured coating can be measured by, for example, as follows. A slice or cross-section of the coating is created using a microtome or similar device, and the thickness is measured using a microscope. Alternatively, the thickness of the coating is measured non-destructively, using a laser microscope. One of these operations is performed at five or more points in a "100% dots" print region of the recording. The largest measured thickness is the maximum thickness of the cured coating.

Embodiments of the present disclosure deliver the following advantages.

Color strength is improved for a cured coating of ink as thin as 5 µm or less in terms of maximum thickness. To be more specific, C.I. Pigment Red 57:1 produces a relatively strong color, and its percentage is 4.0% by mass or more. The cured coating, therefore, achieves improved color strength even when formed thin. Improved color strength of a cured coating leads to good color reproduction of recordings.

Since the maximum thickness of the cured coating is 5 µm or less, furthermore, the recording medium does not thicken when rolled, even when it is flexible packaging film. The ease of rolling up the recording is therefore improved. The liquid layer of ink as a precursor to the cured coating is also thin, which means the recording medium is less likely to crease when the ink cures and shrinks. The thinness of the cured coating also helps improve handling when the recording is subjected to post-treatment, such as lamination. Overall, embodiments of the present disclosure provide an ink jet process and a recording suitable for flexible packaging applications.

7. Examples and Comparative Examples

The following describes advantages of an aspect of the present disclosure in more specific terms by providing examples and comparative examples. The formula, print parameters, and test results for the inks of Examples 1 to 13 and Comparative Examples 1 to 5 are presented in Tables 1 and 2. In the formula section of Tables 1 and 2, the values are in the unit of % by mass, and the "–" cells, without a value, mean that the ink did not contain the ingredient. In Tables 1 and 2, furthermore, the names of some ingredients are in their abbreviated form, which will be explained later. In the following, the inks of Examples 1 to 13 may be referred to collectively as the inks of Examples, the inks of Comparative Examples of 1 to 5 may be referred to collectively as the inks of Comparative Examples, and the inks of Examples and those of Comparative Examples may be referred to collectively as the inks. No aspect of the present disclosure is limited to these examples.

7.1. Preparation of Inks

Inks were prepared according to the compositions specified in Tables 1 and 2. Specifically, the pigment as a colorant, the dispersant, and part of the polymerizable compounds were weighed out and put into a tank for bead-mill dispersion. Then the ingredients in the tank were dispersed with 1-mm diameter ceramic beads to give a liquid dispersion of the pigment in the polymerizable compounds.

Separately, the ingredients not used in the liquid dispersion of pigment above, i.e., the rest of the polymerizable compounds, the photopolymerization initiators, the photosensitizer, the polymerization inhibitor, and the slipping agent, were weighed out and put into a stainless-steel tank for mixing. The ingredients were stirred using a mechanical stirrer until complete dissolution of the photopolymerization initiators and other solids in the polymerizable compounds. A predetermined amount of the liquid dispersion of pigment was added, and the mixture was stirred for another hour under approximately 20° C. conditions. The stirred mixture was filtered through a 5-µm membrane filter. In this way, the inks of Examples and those of Comparative Examples were prepared.

TABLE 1

| Ingredient category | Ingredient name or trade name | Example 1 | Example 2 | Example 3 | Example 4 | Example 5 |
|---|---|---|---|---|---|---|
| Formula-(1) vinyl-containing (meth)acrylate | VEEA | 20.00 | 20.00 | 20.00 | 20.00 | 20.00 |
| Ring-structured monofunctional (meth)acrylates | PEA | 42.49 | 39.97 | 37.87 | 42.49 | 39.97 |
| | IBXA | — | — | — | — | — |
| | TBCHA | — | — | — | — | — |
| | MEDOL-10 | — | — | — | — | — |
| | THFA | — | — | — | — | — |
| Multifunctional monomer | DPGDA | 20.00 | 20.00 | 20.00 | 20.00 | 20.00 |
| Photopolymerization initiators | Omnirad 819 | 5.00 | 5.00 | 5.00 | 5.00 | 5.00 |
| | Speedcure TPO | 5.00 | 5.00 | 5.00 | 5.00 | 5.00 |
| Pigments | Pigment Red 57:1 | 4.10 | 6.50 | 8.50 | 4.10 | 6.50 |
| | Pigment Red 122 | — | — | — | — | — |
| Dispersant | Solsperse 36000 | 0.21 | 0.33 | 0.43 | 0.21 | 0.33 |
| Polymerization inhibitor | MEHQ | 0.20 | 0.20 | 0.20 | 0.20 | 0.20 |
| Slipping agent | BYK-UV3500 | 0.50 | 0.50 | 0.50 | 0.50 | 0.50 |
| Photosensitizer | Speedcure DETX | 2.50 | 2.50 | 2.50 | 2.50 | 2.50 |
| | Total | 100.00 | 100.00 | 100.00 | 100.00 | 100.00 |
| Oxygen concentration during the curing step [vol %] | | 21 | 21 | 21 | 21 | 21 |
| Print parameters in the ejection step | Resolution | 600 × 600 dpi | 600 × 600 dpi | 600 × 600 dpi | 600 × 600 dpi | 600 × 1200 dpi |
| | Ink volume per dot [pL] | 4 | 4 | 4 | 10 | 2 |
| Maximum thickness of the cured coating (100% dots) [μm] | | 2.5 | 2.5 | 2.5 | 5.0 | 2.5 |
| Test results | Curability | B | B | C | A | B |
| | Ease of rolling up | A | A | A | B | A |
| | Color strength | B | A | A | A | A |

| Ingredient category | Ingredient name or trade name | Example 6 | Example 7 | Example 8 | Example 9 |
|---|---|---|---|---|---|
| Formula-(1) vinyl-containing (meth)acrylate | VEEA | 20.00 | 20.00 | 20.00 | 20.00 |
| Ring-structured monofunctional (meth)acrylates | PEA | — | — | — | — |
| | IBXA | 42.49 | — | — | — |
| | TBCHA | — | 42.49 | — | — |
| | MEDOL-10 | — | — | 42.49 | — |
| | THFA | — | — | — | 42.49 |
| Multifunctional monomer | DPGDA | 20.00 | 20.00 | 20.00 | 20.00 |
| Photopolymerization initiators | Omnirad 819 | 5.00 | 5.00 | 5.00 | 5.00 |
| | Speedcure TPO | 5.00 | 5.00 | 5.00 | 5.00 |
| Pigments | Pigment Red 57:1 | 4.10 | 4.10 | 4.10 | 4.10 |
| | Pigment Red 122 | — | — | — | — |
| Dispersant | Solsperse 36000 | 0.21 | 0.21 | 0.21 | 0.21 |
| Polymerization inhibitor | MEHQ | 0.20 | 0.20 | 0.20 | 0.20 |
| Slipping agent | BYK-UV3500 | 0.50 | 0.50 | 0.50 | 0.50 |
| Photosensitizer | Speedcure DETX | 2.50 | 2.50 | 2.50 | 2.50 |
| | Total | 100.00 | 100.00 | 100.00 | 100.00 |
| Oxygen concentration during the curing step [vol %] | | 21 | 21 | 21 | 21 |
| Print parameters in the ejection step | Resolution | 600 × 600 dpi | 600 × 600 dpi | 600 × 600 dpi | 600 × 600 dpi |
| | Ink volume per dot [pL] | 4 | 4 | 4 | 4 |
| Maximum thickness of the cured coating (100% dots) [μm] | | 2.5 | 2.5 | 2.5 | 2.5 |
| Test results | Curability | A | A | A | B |
| | Ease of rolling up | A | A | A | A |
| | Color strength | B | B | B | B |

TABLE 2

| Ingredient category | Ingredient name or trade name | Example 10 | Example 11 | Example 12 | Example 13 | Comparative Example 1 |
|---|---|---|---|---|---|---|
| Formula-(1) vinyl-containing (meth)acrylate | VEEA | 20.00 | 10.00 | 50.00 | 20.00 | 20.00 |
| Ring-structured monofunctional (meth)acrylates | PEA | 10.00 | 52.49 | 12.49 | 42.49 | 42.49 |
| | IBM | 7.00 | — | — | — | — |
| | TBCHA | 10.00 | — | — | — | — |
| | MEDOL-10 | 10.00 | — | — | — | — |
| | THFA | 5.49 | — | — | — | — |
| Multifunctional monomer | DPGDA | 20.00 | 20.00 | 20.00 | 20.00 | 20.00 |
| Photopolymerization initiators | Omnirad 819 | 5.00 | 5.00 | 5.00 | 5.00 | 5.00 |
| | Speedcure TPO | 5.00 | 5.00 | 5.00 | 5.00 | 5.00 |
| Pigments | Pigment Red 57:1 | 4.10 | 4.10 | 4.10 | 4.10 | — |
| | Pigment Red 122 | — | — | — | — | 4.10 |

TABLE 2-continued

| Dispersant | Solsperse 36000 | 0.21 | 0.21 | 0.21 | 0.21 | 0.21 |
|---|---|---|---|---|---|---|
| Polymerization inhibitor | MEHQ | 0.20 | 0.20 | 0.20 | 0.20 | 0.20 |
| Slipping agent | BYK-UV3500 | 0.50 | 0.50 | 0.50 | 0.50 | 0.50 |
| Photosensitizer | Speedcure DETX | 2.50 | 2.50 | 2.50 | 2.50 | 2.50 |
| | Total | 100.00 | 100.00 | 100.00 | 100.00 | 100.00 |
| Oxygen concentration during the curing step [vol %] | | 21 | 21 | 21 | 10 | 21 |
| Print parameters in the ejection step | Resolution | 600 × 600 dpi | 600 × 600 dpi | 600 × 600 dpi | 600 × 600 dpi | 600 × 600 dpi |
| | Ink volume per dot [pL] | 4 | 4 | 4 | 4 | 4 |
| Maximum thickness of the cured coating (100% dots) [μm] | | 2.5 | 2.5 | 2.5 | 2.5 | 2.5 |
| Test results | Curability | A | B | A | AA | A |
| | Ease of rolling up | A | A | A | A | A |
| | Color strength | B | B | B | B | C |

| Ingredient category | Ingredient name or trade name | Comparative Example 2 | Comparative Example 3 | Comparative Example 4 | Comparative Example 5 |
|---|---|---|---|---|---|
| Formula-(1) vinyl-containing (meth)acrylate | VEEA | 20.00 | 20.00 | 20.00 | 20.00 |
| Ring-structured monofunctional (meth)acrylates | PEA | 44.17 | 43.12 | 42.49 | 44.17 |
| | IBM | — | — | — | — |
| | TBCHA | — | — | — | — |
| | MEDOL-10 | — | — | — | — |
| | THFA | — | — | — | — |
| Multifunctional monomer | DPGDA | 20.00 | 20.00 | 20.00 | 20.00 |
| Photopolymerization initiators | Omnirad 819 | 5.00 | 5.00 | 5.00 | 5.00 |
| | Speedcure TPO | 5.00 | 5.00 | 5.00 | 5.00 |
| Pigments | Pigment Red 57:1 | 2.50 | 3.50 | — | 2.50 |
| | Pigment Red 122 | — | — | 4.10 | — |
| Dispersant | Solsperse 36000 | 0.13 | 0.18 | 0.21 | 0.13 |
| Polymerization inhibitor | MEHQ | 0.20 | 0.20 | 0.20 | 0.20 |
| Slipping agent | BYK-UV3500 | 0.50 | 0.50 | 0.50 | 0.50 |
| Photosensitizer | Speedcure DETX | 2.50 | 2.50 | 2.50 | 2.50 |
| | Total | 100.00 | 100.00 | 100.00 | 100.00 |
| Oxygen concentration during the curing step [vol %] | | 21 | 21 | 21 | 21 |
| Print parameters in the ejection step | Resolution | 600 × 600 dpi | 600 × 600 dpi | 600 × 600 dpi | 600 × 600 dpi |
| | Ink volume per dot [pL] | 4 | 4 | 20 | 20 |
| Maximum thickness of the cured coating (100% dots) [μm] | | 2.5 | 2.5 | 10.0 | 10.0 |
| Test results | Curability | A | A | B | B |
| | Ease of rolling up | A | A | C | C |
| | Color strength | C | C | B | B |

The details of the abbreviations and trade names used in Tables 1 and 2 are as follows.
Formula-(1) Vinyl-Containing (Meth)acrylate
  VEEA: 2-2-(Vinyloxyethoxy)ethyl acrylate. Nippon Shokubai
Ring-Structured Monofunctional (Meth)acrylates
  PEA: Phenoxyethyl acrylate. Trade name, Viscoat #192; Osaka Organic Chemical Industry
  IBXA: Isobornyl acrylate. Osaka Organic Chemical Industry
  TBCHA: Tert-butylcyclohexanol acrylate. Trade name, SR217; Sartomer
  MEDOL-10: Trade name. (2-Methyl-2-ethyl-1,3-dioxolan-4-yl)methyl acrylate, Osaka Organic Chemical Industry
  THFA: Tetrahydrofurfuryl acrylate. Osaka Organic Chemical Industry
Multifunctional Monomer
  DPGDA: Dipropylene glycol diacrylate. Sartomer
Photopolymerization Initiators
  Omnirad 819: Trade name. Bis(2,4,6-trimethylbenzoyl)phenylphosphine oxide. IGM Resins B.V.
  Speedcure TPO: Trade name. 2,4,6-Trimethylbenzoyldiphenylphosphine oxide. Lambson Group Ltd.
Dispersant
  Solsperse 36000: Trade name. Lubrizol
Polymerization Inhibitor
  MEHQ: 4-Methoxyphenol. Kanto Chemical Co., Inc.
Slipping Agent
  BYK-UV 3500: Trade name. BYK Additives & Instruments.
Photosensitizer
  Speedcure® DETX: Trade name. 2,4-Diethylthioxanthone. Lambson Group Ltd.

7.2. Production and Testing of Test Recordings

Prior to production and testing, the atmosphere in which the curing step was to be carried out was analyzed for oxygen level using Iijima Electronics's G-103 atmospheric oxygen meter. The measured concentration of oxygen was 21 vol %. Thus, although only for the ink of Example 13, the curing step was conducted in an atmosphere in which the oxygen concentration had been reduced to 10 vol % with nitrogen gas.

Then test recordings were produced using the inks of Examples and those of Comparative Examples. First, the ink was applied by ink jet printing to a recording medium, specifically to Futamura Chemical's FOA biaxially oriented polypropylene (OPP) film (thickness, 20 μm). The ink jet apparatus was Seiko Epson's PX-G930 ink jet printer. The printer was modified to be able to apply ultraviolet-curable inks to plastic film as a recording medium.

Except for Example 5, the pattern of printing of the ink was a solid image recorded with a resolution of 600 dpi (dots per inch) horizontal by 600 dpi vertical. For Example 5, the pattern of printing of the ink was a solid image recorded with a resolution of 600 dpi horizontal by 1200 dpi vertical. The ink volume per dot (pL) calculated from the specific gravity and consumption by mass of the ink is presented in Tables 1 and 2. The specific ink volumes were as follows: the ink of Example 4, 10 pL; the ink of Example 5, 2 pL; the inks of Comparative Examples 4 and 5, 20 pL; all other levels, 4 pL. The ink volume influences the maximum thickness of the cured coating. It should be noted that a solid image is an image having a dot in every pixel, the minimum unit area of recording defined by resolution. Producing a solid image means "100% dots" printing.

7.2.1. Curability Testing

The curability of the liquid layer of ink formed on the recording medium was assessed. Specifically, the liquid layer of ink was irradiated with ultraviolet radiation at different energy levels using an UV-LED as a light source to investigate how much radiation energy was required to make the liquid layer of ink tack-free and form a cured coating, and the inks were graded based on the measured amount of curing energy according to the criteria below. The results are presented in Tables 1 and 2.

Grading Criteria

AA: The amount of radiation energy required was less than 100 mJ/cm$^2$.

A: The amount of radiation energy required was 100 mJ/cm$^2$ or more and less than 150 mJ/cm$^2$.

B: The amount of radiation energy required was 150 mJ/cm$^2$ or more and less than 200 mJ/cm$^2$.

C: The amount of radiation energy required was 200 mJ/cm$^2$ or more.

7.2.2. Testing for the Ease of Rolling Up

As a measure of the ease of rolling up, the maximum thickness of the cured coating was measured. Specifically, a test recording was produced at the tack-free radiation energy determined in the curability testing, the maximum thickness of the cured coating of ink was measured using Keyence's VK-X1000 laser microscope, and the inks were graded based on the measured maximum thickness according to the criteria below. The results are presented in Tables 1 and 2.

Grading Criteria

A: The maximum thickness was 3 µm or less.

B: The maximum thickness was more than 3 µm and 5 µm or less.

C: The maximum thickness was more than 5 µm.

7.2.3. Color Strength Testing

The recordings used in the testing of the ease of rolling up were subjected to measuring OD (optical density), a measure of color strength. Specifically, the OD of the cured coating of each recording was measured using Konica Minolta Sensing's FD-7 colorimeter with a D65 light source at an angle of view of 10°, and the inks were graded based on the measured OD according to the criteria below. The results are presented in Tables 1 and 2.

Grading Criteria

A: The OD was 1.8 or more.

B: The OD was 1.4 or more and less than 1.8.

C: The OD was less than 1.4.

The ink of Example 1 was a level at which PEA was used as a ring-structured monofunctional (meth)acrylate, and the percentage of Pigment Red 57:1 as a pigment was 4.10% by mass of the total amount of the ink. The maximum thickness of the cured coating of the ink of Example 1 was 2.5 µm.

The ink of Example 2 was a level at which PEA was used as a ring-structured monofunctional (meth)acrylate, and the percentage of Pigment Red 57:1 as a pigment was 6.50% by mass of the total amount of the ink. The maximum thickness of the cured coating of the ink of Example 2 was 2.5 µm.

The ink of Example 3 was a level at which PEA was used as a ring-structured monofunctional (meth)acrylate, and the percentage of Pigment Red 57:1 as a pigment was 8.50% by mass of the total amount of the ink. The maximum thickness of the cured coating of the ink of Example 3 was 2.5 µm.

The ink of Example 4 was a level at which the formula was the same as in Example 1, but the ink volume per dot was increased to 10 pL. As a result, the maximum thickness of the cured coating of the ink of Example 4 was 5.0 µm.

The ink of Example 5 was a level at which the formula was the same as in Example 2, but the ink volume per dot was reduced to 2 pL, and the resolution was increased. The maximum thickness of the cured coating of the ink of Example 5 was 2.5 µm.

The ink of Example 6 was a level at which the PEA in the ink of Example 1 was changed to IBXA. The ink of Example 7 was a level at which the PEA in the ink of Example 1 was changed to TBCHA. The ink of Example 8 was a level at which the PEA in the ink of Example 1 was changed to MEDOL-10. The ink of Example 9 was a level at which the PEA in the ink of Example 1 was changed to THFA. The ink of Example 10 was a level at which the PEA in the ink of Example 1 was decreased, and IBXA, TBCHA, MEDOL-10, and THFA were also used.

The ink of Example 11 was a level at which the PEA in the ink of Example 1 was increased, and the VEEA content was reduced to 10% by mass. The ink of Example 12 was a level at which the PEA in the ink of Example 1 was decreased, and the VEEA content was increased to 50% by mass. The ink of Example 13 was a level at which the formula was the same as in Example 1, but the concentration of oxygen during the curing step was 10 vol %.

The ink of Comparative Example 1 was a level at which the pigment of the ink of Example 1 was changed to Pigment Red 122. The ink of Comparative Example 2 was a level at which the pigment content of the ink of Example 1 was reduced to 2.50% by mass, whereas PEA was increased. The ink of Comparative Example 3 was a level at which the pigment content of the ink of Example 1 was reduced to 3.50% by mass, whereas PEA was increased.

The ink of Comparative Example 4 was a level at which the formula was the same as in Comparative Example 1, but the ink volume per dot was increased to 20 pL. As a result, the maximum thickness of the cured coating of the ink of Comparative Example 4 was 10.0 µm. The ink of Comparative Example 5 was a level at which the formula was the same as in Comparative Example 2, but the ink volume per dot was increased to 20 pL. As a result, the maximum thickness of the cured coating of the ink of Comparative Example 5 was 10.0 µm.

7.2.4. Summary of Test Results

As shown in Tables 1 and 2, the inks of Examples all achieved a B (acceptable) or better grade in color strength. In particular, in Examples 2, 3, and 5, in which the percentage of Pigment Red 57:1 was more than 4.10% by mass, and Example 4, in which the ink volume per dot was 10 pL, the color strength grade was A (good).

As for curability, all levels among the inks of Examples achieved a B (acceptable) or better grade except in Example 3, in which the percentage of Pigment Red 57:1 was more than 8.0% by mass and the curability grade was C (poor). In particular, the ink of Example 13, in which the concentration of oxygen during the curing step was not higher than 15 vol %, achieved an AA grade (excellent).

As for the ease of rolling up, all levels in the Examples excluding Example 4 achieved an A grade (good); the maximum thickness of the cured coating was 2.5 μm. The ink of Example 4 was given a B (acceptable) grade as the maximum thickness of the cured coating was 5.0 μm.

Overall, the inks of Examples achieved improved color strength. Many of them, furthermore, were found to be superior in curability and the ease of rolling up, too.

In Comparative Examples, the color strength grade was C (poor) for the inks of Comparative Examples 1 to 3. The inks of Comparative Examples 4 and 5 were given a C (unacceptable) grade in the ease of rolling up of a recording, although the color strength grade was B (acceptable). An unacceptable difficulty in rolling up means that roll-to-roll printing is difficult with that ink. Overall, the inks of Comparative Examples were found to be inferior in color strength or productivity.

What is claimed is:

1. An ink jet process comprising:
   an ejection step, in which a radiation-curable ink jet composition is ejected from an ink jet head to a recording medium; and
   a curing step, in which the ejected ink jet composition is irradiated with radiation to give a cured coating of the ink jet composition, wherein:
   the ink jet composition contains at least one polymerizable compound, at least one photopolymerization initiator, and C.I. Pigment Red 57:1;
   the C.I. Pigment Red 57:1 constitutes 4.0% by mass or more of a total amount of the ink jet composition;
   the at least one polymerizable compound includes (2-methyl-2-ethyl-1,3-dioxolan-4-yl)methyl acrylate; and
   the cured coating has a maximum thickness of 5 μm or less.

2. The ink jet process according to claim 1, wherein the C.I. Pigment Red 57:1 constitutes 8.0% by mass or less of the total amount of the ink jet composition.

3. The ink jet process according to claim 1, wherein the polymerizable compound includes a vinyl-containing (meth) acrylate represented by formula (1),

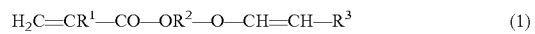  (1)

where $R^1$ is a hydrogen atom or methyl group, $R^2$ is a C2 to C20 divalent organic residue, and $R^3$ is a hydrogen atom or C1 to C11 monovalent organic residue.

4. The ink jet process according to claim 1, wherein the photopolymerization initiator includes an acylphosphine oxide photopolymerization initiator.

5. The ink jet process according to claim 1, wherein the curing step is carried out at an oxygen concentration of 15 vol % or less.

6. The ink jet process according to claim 1, wherein the recording medium is polyethylene terephthalate film, polyolefin film, or nylon film.

* * * * *